United States Patent
Guest

(10) Patent No.: US 6,880,865 B2
(45) Date of Patent: Apr. 19, 2005

(54) TUBE COUPLINGS

(75) Inventor: John Derek Guest, Maidenhead (GB)

(73) Assignee: John Guest International Ltd., West Drayton (GB)

( * ) Notice: Subject to any disclaimer, the term of this patent is extended or adjusted under 35 U.S.C. 154(b) by 0 days.

(21) Appl. No.: 10/288,951

(22) Filed: Nov. 6, 2002

(65) Prior Publication Data

US 2003/0085568 A1 May 8, 2003

(30) Foreign Application Priority Data

Nov. 7, 2001 (GB) .............................................. 0126798

(51) Int. Cl.⁷ .............................................. F16L 21/06
(52) U.S. Cl. .................................... 285/322; 285/382.7
(58) Field of Search ......................... 285/322, 39, 323, 285/382.7, 92

(56) References Cited

U.S. PATENT DOCUMENTS

| | | | | |
|---|---|---|---|---|
| 2,452,277 A | * | 10/1948 | Woodling | ................ 285/382.7 |
| 2,640,716 A | | 6/1953 | Bigelow | |
| 2,953,398 A | | 9/1960 | Haugen et al. | |
| 3,250,550 A | | 5/1966 | Lyon | |
| 3,334,661 A | | 8/1967 | Milette | |
| 3,454,290 A | | 7/1969 | Tairraz | |
| 3,552,781 A | * | 1/1971 | Helland | ................ 285/382.7 |
| 3,679,241 A | * | 7/1972 | Hoffmann | ................ 285/340 |
| 3,747,964 A | | 7/1973 | Nilsen, Jr. | |
| 3,834,742 A | | 9/1974 | McPhillips | |
| 3,909,046 A | | 9/1975 | Legris | |
| 3,989,283 A | * | 11/1976 | Pepper | ................ 285/323 |
| 4,005,883 A | | 2/1977 | Guest | |
| 4,025,093 A | | 5/1977 | Leczycki | |
| 4,062,572 A | * | 12/1977 | Davis | ................ 285/382.7 |
| 4,136,897 A | | 1/1979 | Haluch | |
| 4,188,051 A | * | 2/1980 | Burge | ................ 285/323 |
| 4,253,686 A | | 3/1981 | Aitken et al. | |
| 4,298,222 A | | 11/1981 | Davies | |
| 4,305,606 A | | 12/1981 | Legris | |
| 4,309,050 A | | 1/1982 | Legris | |
| 4,335,908 A | * | 6/1982 | Burge | ................ 285/323 |
| 4,613,158 A | | 9/1986 | Ekman | |
| 4,637,636 A | * | 1/1987 | Guest | ................ 285/323 |
| 4,655,159 A | | 4/1987 | McMills | |
| 4,867,489 A | | 9/1989 | Patel | |
| 4,993,755 A | | 2/1991 | Johnston | |

(Continued)

FOREIGN PATENT DOCUMENTS

| | | |
|---|---|---|
| EP | 0 945 662 | 9/1999 |
| EP | 0 945 662 A2 | 9/1999 |
| EP | 1 087 168 A1 | 3/2001 |
| EP | 1 233 225 A1 | 2/2002 |
| EP | 1 310 720 A2 | 5/2003 |
| EP | 1 359 362 A1 | 11/2003 |
| EP | 1 359 363 A2 | 11/2003 |
| FR | 2 227 483 | 11/1974 |
| FR | 2 394 736 | 1/1979 |
| FR | 2 689 205 | 10/1993 |
| GB | 1 520 742 | 8/1978 |
| GB | 2 167 147 | 5/1986 |
| WO | WO 95/28593 | 10/1995 |

Primary Examiner—Eric K. Nicholson
(74) Attorney, Agent, or Firm—Workman Nydegger

(57) ABSTRACT

A tube coupling includes a coupling body having a throughway open at one end to receive an end portion of a tube, an annular step in the throughway facing the open end to provide an end stop for a tube end, and an end cap engaging the coupling body for axial movement between forward and retracted positions on the body. The end cap has an opening for the end portion of the tube to extend therethrough and a tube locking collet in the cap to permit entry of a tube into the cap and to resist withdrawal. An annular seal is located in the coupling body adjacent the annular step, the seal having an inner annular portion with which the tube end is engageable and an outer annular portion, and a sleeve between the locking device and seal to compress the outer annular portion of the seal axially.

18 Claims, 4 Drawing Sheets

U.S. PATENT DOCUMENTS

| | | | |
|---|---|---|---|
| 5,121,949 A | * | 6/1992 | Reese .................. 285/322 |
| 5,150,924 A | | 9/1992 | Yokomatsu et al. |
| 5,181,751 A | | 1/1993 | Kitamura |
| 5,217,261 A | | 6/1993 | DeWitt et al. |
| 5,362,110 A | | 11/1994 | Bynum |
| 5,388,866 A | | 2/1995 | Schlosser |
| 5,466,019 A | | 11/1995 | Komolrochanapron |
| 5,593,186 A | * | 1/1997 | Harris .................. 285/322 |
| 5,957,509 A | | 9/1999 | Komolrochanapron |
| 6,056,326 A | * | 5/2000 | Guest .................. 285/322 |
| 6,193,239 B1 | | 2/2001 | Fukano et al. |
| 5,607,190 A1 | | 9/2001 | Exandier et al. |
| 6,293,595 B1 | | 9/2001 | Marc et al. |
| 2002/0109353 A1 | | 8/2002 | Guest |
| 2003/0006610 A1 | | 1/2003 | Werth |
| 2003/0085568 A1 | | 5/2003 | Guest |

* cited by examiner

TUBE COUPLINGS

CROSS-REFERENCE TO RELATED APPLICATIONS

The present application claims priority to United Kingdom Application No. 0126798.8, filed Nov. 7, 2001 which is incorporated herein by specific reference.

BACKGROUND OF THE INVENTION

1. The Field of the Invention

This invention relates to tube couplings which may be single or multiple tube couplings providing inline, elbow or T-couplings or tube closures.

2. The Relevant Technology

Our "Speedfit" tube connector (the subject of UK Patent No. 1520742) has a coupling body with a throughway open at one end and a tapered cam surface in the open end to receive a collet for locking a tube in the coupling. The collet is compressed against the tube by a slight withdrawal of the tube and collet from the coupling body which locks the tube in the coupling body. The collet can be depressed into the body to release the tube.

Our "Superseal" connector (the subject of our UK Patent No. 2167147) has a separate sleeve screwed onto the open end of the coupling body in which the tapered cam is formed. By screwing the sleeve onto the coupling body the gripping action of the collet on the tube is increased. Also the collet becomes locked up in the coupling body and cannot be depressed to release the tube.

Our "Speedfit/Superseal" coupling (the subject of European Patent Publication No. 0945662) comprises a coupling body having a throughway open at one end to receive an end portion of a tube and having an internal cam surface tapering towards the open end in which a collet is located for locking the tube in the coupling body by engagement with the tapered cam surface, and having step means to limit entry of the collet into the throughway, the coupling body having a main body the throughway of which receives the end of a tube and contains said step means to limit insertion of the collet and an end cap in screw threaded engagement with the main body containing said open end to the throughway and the tapered cam surface, and indexing means between the end cap and main body to define different positions of rotational adjustment in the first of which a tube can be inserted and, by depressing the collet into the coupling body, released from the coupling body and in the second of which the collet is engaged with the step means to prevent the collet being depressed into the coupling body to release the tube. In the preferred arrangement the end cap has an internally threaded sleeve portion encircling and in screw threaded engagement with an external thread on the main body.

In the latter construction, an "O" ring seal is provided in the throughway in the coupling body to engage and seal with the outer surface of the tube. The seal is spaced from the ends of the collet by a washer or sleeve. This arrangement provides small cavities between adjacent components in which liquids can penetrate and become trapped and difficult to remove by cleaning. Such entrapped liquids can deteriorate over a period of time and cause contamination in subsequent liquid flowing through the coupling.

Our European Patent Publication No. 1233225 discloses a tube coupling to receive and hold a tube comprising a coupling body having a throughway open at one end to receive a tube, an annular step in the throughway facing the open end to receive an end of a tube, an end cap engaging the coupling body for axial movement between forward and retracted position on the coupling body, the end cap having an opening for the tube to extended through, a seal located in the coupling body between the step and the open end of the body and in the form of an annular sleeve encircling the throughway, the seal having an out turned annular flange at one end which engages with the annular step to receive and seal with an end of the tube inserted into the throughway and means operable by the end cap to compress the sleeve around the outer surface of the tube adjacent said end of the tube to from a seal with the end of the tube.

This arrangement provides a combination of the "Speedfit" and "Superseal" features referred to above in which any potential leak paths from an end of a tube in the coupling body is minimised and recesses or cavities between adjacent components in the leak path are minimised to present a substantially clean, smooth internal surface to the outer side of the tube connected in the coupling.

The latter arrangement is, however, relatively complicated requiring inter fitting components which present some manufacturing difficulties particularly for small sizes of tube couplings.

SUMMARY OF THE INVENTION

This invention provides a tube coupling to receive and hold a tube comprising a coupling body having a throughway open at one end to receive an end portion of tube, an annular step in the throughway facing the open end to provide an end stop for a tube end, an end cap engaging the coupling body for axial movement between forward and retracted positions on the body, the end cap having an opening for the end portion of the tube to extend therethrough and a tube locking device in the cap to promote entry of a tube into the cap and to resist withdrawal of the cap, an annular seal located in the coupling body adjacent the annular step, the seal having an inner annular portion with which the tube end is engageable and an outer annular portion, and means to compress the outer annular portion of the seal axially in response to forward movement of the end cap to cause the inner portion of the seal to be pressed into sealing engagement with the tube end.

For example, the means to compress the outer portion of the annular seal may comprise an annular sleeve located in the throughway in the coupling body through which the tube extends, the sleeve having one end in engagement with the outer annular portion of the seal and the other end in engagement directly or indirectly with the cap to be forced into engagement with the seal by forward movement of the cap on the coupling body.

The annular seal may be in the form of an annular disc having an inner and an annular portion for engagement by the tube end, and an outer annular portion for engagement by said compressing means.

More specifically, the outer portion of the annular seal may have an annular projection facing the open end of the coupling body with which said compressing means is engageable, the end portion of the tube engaging the inner annular portion of the seal within the projection so that compression of the projection presses the projection into sealing engagement with the outer surface of the tube.

The projection on the outer annular portion of the seal may comprise a shallow collar formed on the outer periphery of the seal within which the tube end may engage, the collar having a rounded end portion with which the means to compress the outer portion of the seal engage.

Alternatively, the outer annular portion of the seal may have a toroidal shape project within which the end portion of the tube engages the seal and with which the means to compress the outer portion of the seal engage the toroidal shaped projection when compressed the sealing against the outer surface of the tube end.

In any of the above arrangements the tube locking device in the cap may comprise an annular collet having a plurality of resilient arms and the cap has a cam surface which tapers towards the open end of the cap with which the resilient arms of the collet are engageable to be pressed inwardly with movement of the collet towards the open end of the cap to force the arms into gripping engagement with the tube.

In the latter arrangement, the ends of the arms of the collet may be engageable with the means to compress the outer portion of the sealing ring so that when the cap is moved in a forward direction on the coupling body, the collet moving with the cap forcing the compression means to act on the outer portion of the seal to compress the seal into sealing engagement with the end of the tube.

Also in any of the above arrangements the interengaging means may be provided between the cap and coupling body which, on rotation of the cap in one direction drives the cap forwardly on the coupling body and in the opposite direction rearwardly on the coupling body.

By way of example, the coupling body may have a spirally wound groove, and the cap has a projection or projections engaging in the groove to cause the cap to move forwardly or rearwardly on the body with rotation of the cap in one or other direction.

More specifically, the spirally wound groove on the coupling body may extend approximately half way round the coupling body and the cap may have a projection engaging in the groove so that a half turn of the cap with respect to the coupling body advances or retracts the cap over the total travel of the cap permitted by the groove.

In the latter arrangement detent means may be provided for retaining the projection in the fully advanced or fully retarded position in the helically wound groove.

BRIEF DESCRIPTION OF THE DRAWINGS

The following is a description of some specific embodiments to the invention, reference being made to the accompanying drawings in which.

DESCRIPTION OF THE PREFERRED EMBODIMENTS

Figure 1:
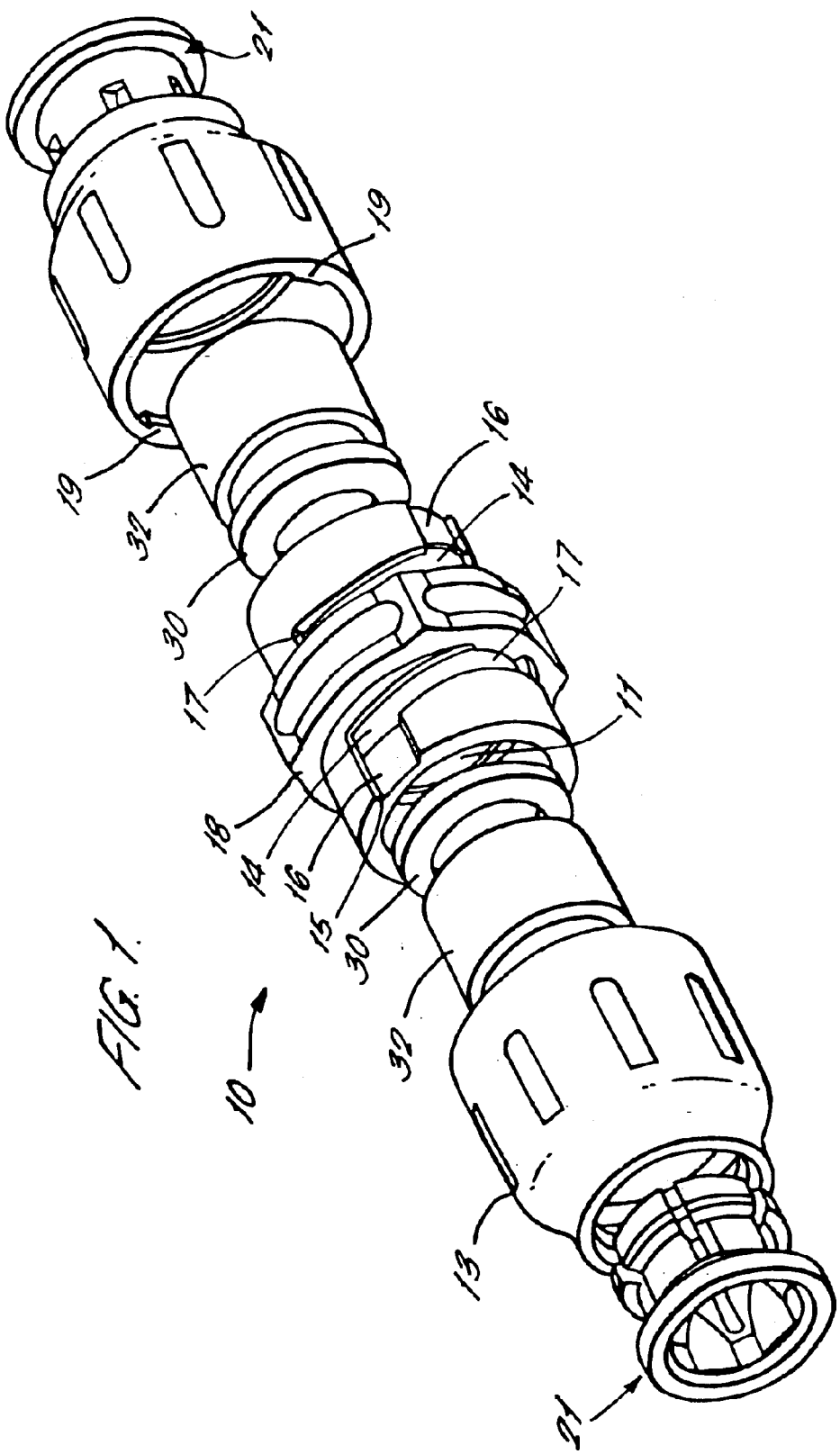
FIG. 1 is an exploded perspective view of a straight double-ended connector for two lengths of tube.
Figure 2:
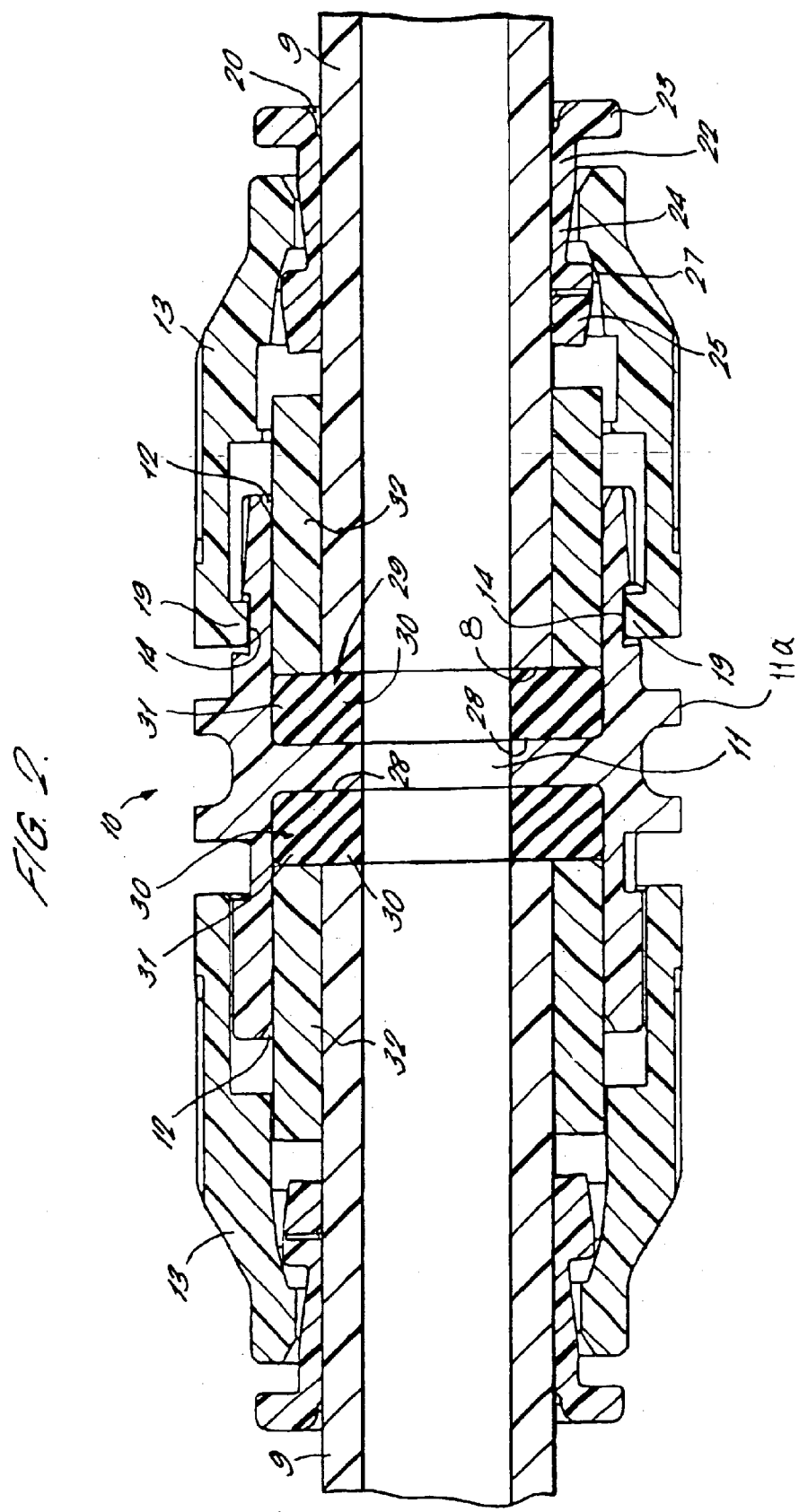
FIG. 2 is a sectional view through the coupling of FIG. 1.

Referring firstly to FIGS. 1 and 2 of the drawings, there is shown a tube coupling which is generally of the form described and illustrated in our European Patent Publication No. 0945662. That application discloses a tube coupling embodying features of our "Speedfit" tube connector which forms the subject of our UK Patent No. 1520742 with the features of our "Superseal" connector as described in our UK patent No. 2167147. The tube coupling comprises a coupling body having a main body part end cap on the body part, and a collet for gripping a tube to be locked in the coupling body located in the end cap with a seal for engaging the tube is located in the main body part. In one position of the end cap on the main body part, a tube can be locked in or released from the coupling body by the collet as described in our UK Patent Publication No. 1520742. The gripping action of the collet on the tube can enhanced by screwing the end cap further onto the main body part of the coupling as described in our UK Patent Publication No. 2167147 and means are provided as described in our European Patent Publication No. 0945662 to index the movement of the end cap with respect to the main body part so that the end cap is readily adjustable between the first position in which the tube can be engaged by a collet but readily released when required and a second position in which the tube is locked against release in the collet.

In accordance with the present invention, a tube connector comprises a coupling body 10 having a throughway 11 open at one end 12 to receive internally an end portion of a tube (not shown) and externally an end cap 13. The coupling body has a pair of helical grooves 14 spaced diametrically apart around the body, each having an axially extending entry 15 over a step 16. The grooves extend from the entry around and along the coupling body to terminate at inner ends 17 adjacent an enlarged integral collar 18 encircling the coupling body. The caps 13 has lugs 19 spaced diametrically across the lugs 14 on the inner periphery of the cap to engage in the grooves 14. The cap 13 is presented to the coupling body with the lugs 19 in line with the entry ends 15 to the grooves. The lugs are snapped over the steps 16 by an axial movement of the cap following which the cap can be tightened onto the coupling body by rotation. As the cap rotates the lugs 18 traverse the grooves 14 drawing the cap along the body until the lugs reach the inner ends 17 of the grooves adjacent the central block 11a.

The end cap 13 has an open end 20 in which a collet indicated generally at 21 is engaged. The collet comprises an annular portion 22 which projects from the open end 20 of the end cap and is formed with an out turned annular flange or head 23 which can be manually gripped for manipulating the collet. A portion of the collet extending into the throughway in the end cap has axially extending resilient arms 24 with which terminate in heads 25 having integral barbs or teeth 26 on the inner sides thereof to grip the tube extending through the collet.

There is a tapered cam surface 27 formed in the end cap with which the heads 25 of the collet are engageable to be compressed inwardly as the collet is drawn outwardly of the throughway to cause the barbs 26 on the inner sides of the heads of the collet to grip and engage a tube extending through the collet.

The throughway 11 in the main body part is formed with a step 28 facing the open end of the coupling body to receive an end of a tube to be connected in the coupling body. An annular seal 29 is positioned in the coupling body against the annular step 28. The seal has an inner annular portion 30 to receive an end of a tube to be secured in the coupling body as described later. The end of the tube is cut square to ensure full engagement with the seal. The seal has an outer annular portion 31 and an annular sleeve 32 is slidably located in the throughway between the outer portion 31 of the seal and the heads 25 of the collet.

As shown in FIG. 2 of the drawings the end cap 13 is in its retracted position in which a tube 9 is received. The tube 9 is pushed fully home into the coupling body 10 by turning the end cap 13 through approximately a half turn of movement with the tube locked in the end cap 13 by the collet 21.

This movement of the end cap 13 into the forward position in not specifically shown but is inherent from the drawings. The end cap 13 advances along the coupling body 10 and the end of tube 9 is moved in engagement with the seal 31. Specifically, tube 9 terminates at an end face 8 that biases against seal 31. The heads 25 of the ends of the arms 14 of the collet 21 engage the adjacent end of the sleeve 32 forcing the sleeve 32 further into the coupling body 10. The sleeve 32 is forced by the collet 21 against the outer portion 31 of the seal 29 to compress the seal 29 and force the inner portion 30 into engagement with the end face 8 of the tube 9.

One end only of the coupling body 10 has been described and the other end of the body illustrated which is an in-line connector is similarly formed but with the cap 13 rotated so that the lugs 19 are not visible.

Figure 3:
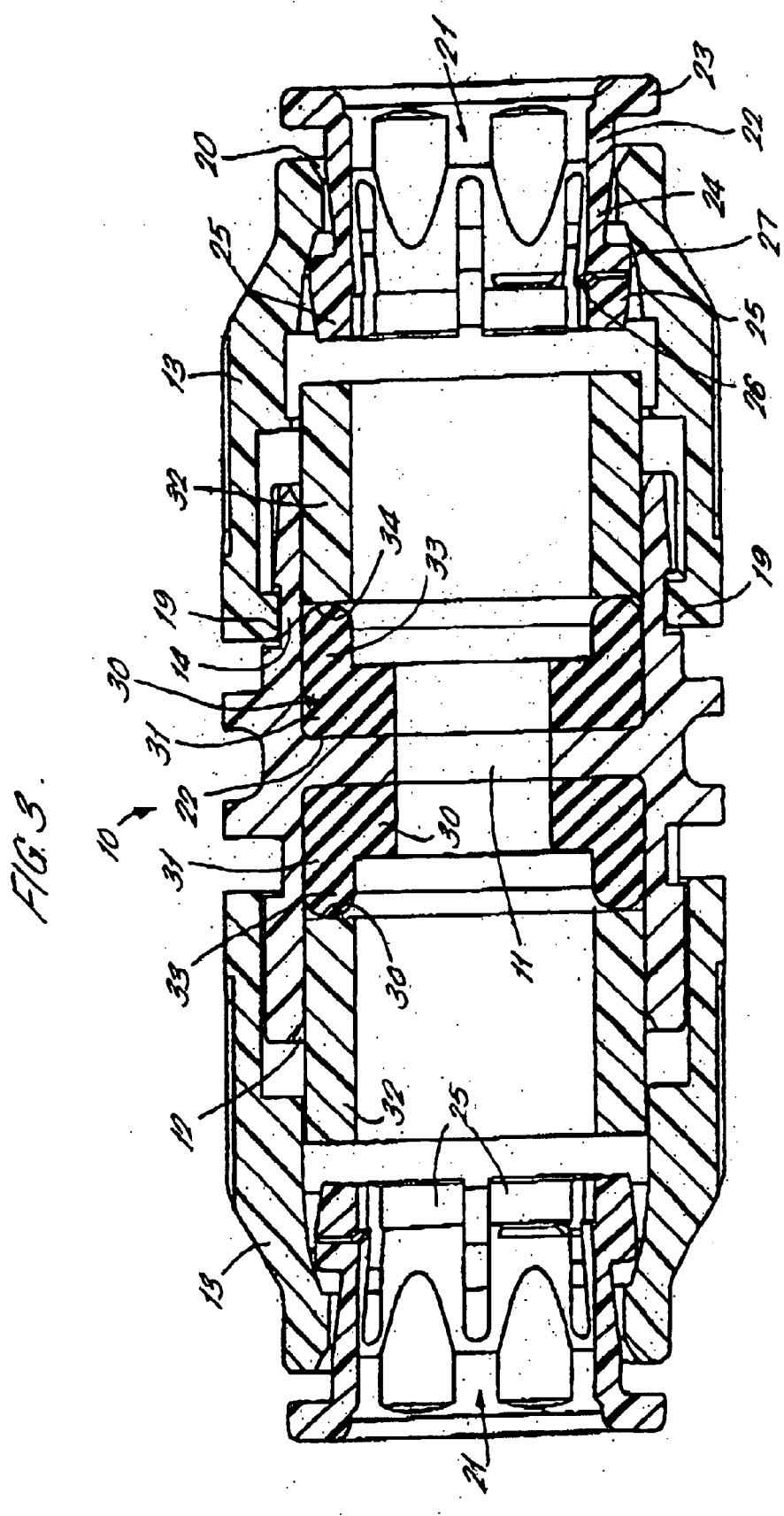
FIG. 3 is a sectional view through a first modified version of the coupling of FIG. 1.

FIG. 3 of the drawings shows a further arrangement in which the seal 29 is formed with an axially projecting collar 33 around the outer peripheral portion 31. The collar has a rounded end 34 with which the sleeve is engageable. The end of the tube engages the seal within the collar and pressure of the sleeve on the collar forces the collar inwardly to seal with the outer periphery of the tube in addition to the end seal on the tube.

Figure 4:
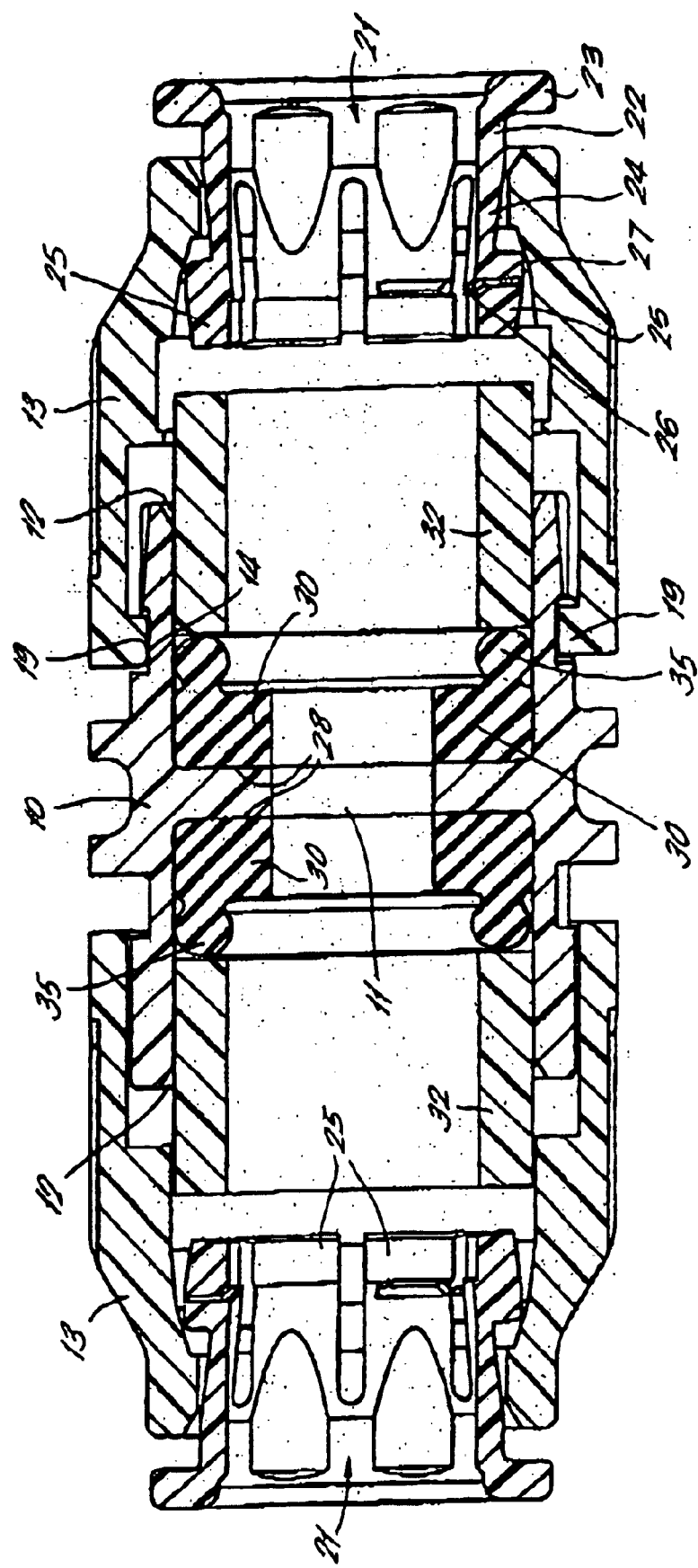
FIG. 4 is a sectional view through a second modified version of the coupling

FIG. 4 shows a still further arrangement in which the seal 29 has a raised toroidal shaped projection 35 around the outer portion of the seal with which the sleeve is engageable to press the toroid shaped projection in engagement with the periphery of the tube. Other features of the arrangement are as previously described with reference to FIGS. 1 and 2.

What is claimed is:

1. A tube coupling to receive and hold a tube comprises:
   a coupling body having a throughway open at a first end to receive an end portion of a tube, the end portion of the tube terminating at an end face;
   an annular step in the throughway facing the first end to provide an end stop for the tube;
   an end cap engaging the coupling body for axial movement between forward and retracted positions on the coupling body, the end cap having an opening for the end portion of the tube to extend therethrough and a tube locking device in the end cap to permit entry of the tube into the end cap and to resist withdrawal of the tube;
   an annular seal located in the coupling body adjacent the annular step, the seal having an axially facing inner annular portion with which the tube end is engageable and an axially facing outer annular portion; and
   a sleeve acting between the tube locking device and the outer annular portion of the seal for compressing the outer annular portion of the seal axially in response to forward movement of the locking device by the end cap to cause the inner portion of the seal to be pressed into sealing engagement with the end face of the tube.

2. A tube coupling as claimed in claim 1, wherein the annular seal is in the form of an annular disc having the axially facing inner annular portion for engagement by the end face of the tube, and the outer annular portion for engagement by the sleeve.

3. A tube coupling as claimed in claim 1, wherein the outer annular portion of the annular seal has an annular projection facing the end of the coupling body with which the sleeve for compressing is engageable, the end portion of the tube engaging the inner annular portion of the seal within the projection so that compression of the projection presses the projection into sealing engagement with an outer surface of the tube.

4. A tube coupling as claimed in claim 3, wherein the projection on the outer annular portion of the seal comprises a shallow collar formed on the outer periphery of the seal within which the end portion of the tube may engage, the collar having a rounded end portion with which the sleeve for compressing the outer annular portion of the seal engages.

5. A tube coupling as claimed in claim 3, wherein the outer annular portion of the seal has a toroidal shaped projection within which the end portion of the tube engages the seal and with which the sleeve for compressing the outer annular portion of the seal engages the toroidal shaped projection, when compressed, the sealing against the outer surface of the end portion of the tube.

6. A tube coupling as claimed in 1, wherein the tube locking device in the cap comprises an annular collet having a plurality of resilient arms and the cap has a cam surface which tapers towards the open end of the cap with which the resilient arms of the collet are engageable to be pressed inwardly with movement of the collet towards the open end of the cap to force the arms into gripping engagement with the tube.

7. The tube coupling as claimed in claim 6, wherein the ends of the arms of the collet are engageable with the sleeve for compressing the outer annular portion of the seal so that when the cap is moved in a forward direction on the coupling body, the collet moving with the cap forcing the sleeve for compressing to act on the outer portion of the seal to compress the seal into sealing engagement with the end portion of the tube.

8. A tube coupling as claimed in 1, further comprising means for interengaging the cap and the coupling body such that rotation of the cap in one direction drives the cap forwardly on the coupling body and in the opposite direction rearwardly on the coupling body.

9. A tube coupling as claimed in claim 8, wherein the means for interengaging comprises the coupling body having a spirally wound groove, and the cap having a projection or projections engaging in the groove to cause the cap to move forwardly or rearwardly on the body with rotation of the cap in one or other direction.

10. A tube coupling as claimed in claim 9, wherein the spirally wound groove on the coupling body extends approximately halfway round the coupling body and the cap has a projection engaging in the groove so that a half turn of the cap with respect to the coupling body advances or retracts the cap over the total travel of the cap permitted by the groove.

11. A tube coupling as claimed in claim 9, further comprising means for retaining the projection in the fully advanced or fully retarded position in the helically wound groove.

12. A tube coupling as claimed in claim 10, further comprising means for retaining the projection in the fully advanced or fully retarded position in the helically wound groove.

13. A tube coupling to receive and hold a tube, the tube coupling comprising:

a coupling body having an interior surface bounding a throughway, the throughway being adapted to receive a first end of a tube, the first end of the tube terminating at an end face;

a step projecting from the interior surface of the coupling body into the throughway;

a tubular end cap engaging the coupling body for selective axial movement between a forward position and a retracted position on the coupling body;

a collet at least partially disposed within the tubular end cap;

an annular seal located in the coupling body adjacent to the annular step, the annular seal having a first portion and a second portion; and a sleeve movably disposed between the collet and the annular seal, the sleeve compressing the first portion of the annular seal so as to cause the second portion of the annular seal to bias against the end face of the tube when the first end of the tube is disposed within the coupling body and the tube cap is in the forward position.

14. A tube coupling as claimed in claim 13, wherein the collet biases against the sleeve so as to compress the sleeve against the seal when the end cap is moved to the forward position.

15. A tube coupling as claimed in claim 13, wherein a portion of the seal encircles the first end of the tube.

16. A tube coupling as claimed in claim 13, wherein the second portion of the seal comprises a substantially flat face that biases against the end face of the tube.

17. A tube coupling as claimed in claim 13, wherein the collet is movably disposed within the end cap.

18. A tube coupling as claimed in claim 13, wherein the step is integrally formed with the coupling body.

* * * * *

UNITED STATES PATENT AND TRADEMARK OFFICE
CERTIFICATE OF CORRECTION

PATENT NO. : 6,880,865 B2  
DATED : April 19, 2005  
INVENTOR(S) : John Derek Guest Page 1 of 1

It is certified that error appears in the above-identified patent and that said Letters Patent is hereby corrected as shown below:

Title page,  
Item [56], References Cited, U.S. PATENT DOCUMENTS,  
Pat. No. 5,607,190, change "9/2001" to -- 3/1997 --.

Column 4,  
Line 6, before "enhanced" insert -- be --.  
Line 25, change "caps 13" to -- cap 13 --.  
Line 26, change "lugs 14" to -- cap 13 --.  
Line 32, change "lugs 18" to -- lugs 19 --.  
Line 42, before "which terminate" remove "with".

Column 5,  
Line 66, after "projection facing the" insert -- first --.

Column 6,  
Line 18, before "sealing against the outer" remove "the".  
Lines 20 and 37, change "claimed in 1" to -- claimed in claim 1 --.

Signed and Sealed this

Twenty-seventh Day of September, 2005

JON W. DUDAS  
*Director of the United States Patent and Trademark Office*